US012601598B2

(12) United States Patent
Chen et al.

(10) Patent No.: US 12,601,598 B2
(45) Date of Patent: Apr. 14, 2026

(54) TRAJECTORY PREDICTION WITH DATA NORMALIZATION

(71) Applicant: ASSA ABLOY AB, Stockholm (SE)

(72) Inventors: Jianbo Chen, Cedar Park, TX (US); Kapil Sachdeva, Round Rock, TX (US); Sylvain Jacques Prevost, Austin, TX (US)

(73) Assignee: ASSA ABLOY AB, Stockholm (SE)

( * ) Notice: Subject to any disclaimer, the term of this patent is extended or adjusted under 35 U.S.C. 154(b) by 265 days.

(21) Appl. No.: 18/257,172

(22) PCT Filed: Dec. 7, 2021

(86) PCT No.: PCT/EP2021/084591
§ 371 (c)(1),
(2) Date: Jun. 13, 2023

(87) PCT Pub. No.: WO2022/128627
PCT Pub. Date: Jun. 23, 2022

(65) Prior Publication Data
US 2024/0094006 A1 Mar. 21, 2024

Related U.S. Application Data

(60) Provisional application No. 63/125,041, filed on Dec. 14, 2020.

(51) Int. Cl.
*G01C 21/20* (2006.01)
*G01C 21/12* (2006.01)
(Continued)

(52) U.S. Cl.
CPC ........... *G01C 21/206* (2013.01); *G01C 21/12* (2013.01); *G07C 9/00571* (2013.01); *G07C 9/28* (2020.01); *H04W 4/33* (2018.02)

(58) Field of Classification Search
CPC .. G01C 21/206; G01C 21/12; G07C 9/00571; G07C 9/28; H04W 4/33; H04W 12/63;
(Continued)

(56) References Cited

U.S. PATENT DOCUMENTS

| | | | |
|---|---|---|---|
| 7,499,674 B2 | 3/2009 | Salokannel et al. | |
| 7,597,250 B2 | 10/2009 | Finn | |

(Continued)

FOREIGN PATENT DOCUMENTS

| | | | |
|---|---|---|---|
| CN | 202703516 | 1/2013 | |
| CN | 105222768 | 1/2016 | |

(Continued)

OTHER PUBLICATIONS

"European Application Serial No. 21836060.0, Response to Communication Pursuant to Rules 161 and 162 EPC Filed Jan. 22, 2024", 15 pages.

(Continued)

*Primary Examiner* — Diane D Mizrahi
*Assistant Examiner* — Jing Gao
(74) *Attorney, Agent, or Firm* — Schwegman Lundberg & Woessner, P.A.

(57) ABSTRACT

Methods and systems (100) for trajectory prediction are provided. The methods and systems (100) include operations comprising: receiving (501) a plurality of observed speed points; processing (502) the plurality of observed speed points corresponding to the observed trajectory by a machine learning technique to generate a plurality of predicted speed points, the machine learning technique being trained to establish a relationship between a plurality of training observed speed points and training predicted speed points; determining (503) a future trajectory based on the plurality of predicted speed points, each of the plurality of predicted speed points corresponding to a different slice of (Continued)

a plurality of slices of the future trajectory; determining (504) that a target access control device is within a threshold range of the future trajectory; and performing (505) an operation associated with the target access control device (110).

20 Claims, 7 Drawing Sheets

(51) Int. Cl.
    *G07C 9/00*     (2020.01)
    *G07C 9/28*     (2020.01)
    *H04W 4/33*     (2018.01)

(58) Field of Classification Search
    CPC ..... H04W 12/71; H04W 4/029; H04W 4/021; H04W 4/38; H04W 4/027; H04W 4/024; H04W 4/70; H04W 12/06; H04W 48/16; H04W 8/005; H04W 12/08; H04W 12/069; H04W 4/02; H04W 72/51; H04W 64/003; H04W 12/041; H04W 88/02; H04W 12/068; H04W 12/50; H04W 4/025; H04W 12/04; H04W 4/026; H04W 64/00; H04W 12/03; H04W 24/10; H04W 36/32; H04W 36/322; G06N 3/08; G06N 20/00; G06N 3/045; G06N 3/02; G06N 3/047; G06N 3/09; G05D 1/0088; G05D 1/0212; G05D 1/646; G05D 1/0274; G05D 1/43; G05D 1/0221; G05D 2101/10; G01S 7/417; G01S 17/58; H04L 67/52; H04L 67/535; H04L 2025/03464; H04L 25/03165
    See application file for complete search history.

(56) References Cited

U.S. PATENT DOCUMENTS

| | | | |
|---|---|---|---|
| 7,756,002 B2 | 7/2010 | Batra et al. | |
| 7,881,746 B2 | 2/2011 | Desai | |
| 7,995,644 B2 | 8/2011 | Sahinoglu et al. | |
| 8,355,671 B2 | 1/2013 | Kramer et al. | |
| 8,478,360 B2 | 7/2013 | Soliman | |
| 8,736,438 B1 | 5/2014 | Vasquez et al. | |
| 8,913,599 B2 | 12/2014 | Gonikberg et al. | |
| 9,408,147 B2 | 8/2016 | Polo et al. | |
| 9,530,265 B2 | 12/2016 | Lee et al. | |
| 9,666,005 B2 | 5/2017 | Ellis et al. | |
| 9,721,404 B2 | 8/2017 | Muller | |
| 9,769,627 B2 | 9/2017 | Siswick et al. | |
| 9,942,849 B1 | 4/2018 | Hariharan et al. | |
| 10,117,046 B2 | 10/2018 | Ledvina et al. | |
| 10,171,129 B1 | 1/2019 | Hammerschmidt et al. | |
| 10,356,553 B2 | 7/2019 | Sant et al. | |
| 10,486,646 B2 | 11/2019 | Ledvina et al. | |
| 10,567,034 B2 | 2/2020 | Hammerschmidt et al. | |
| 10,602,556 B2 | 3/2020 | Foster et al. | |
| 10,652,925 B2 | 5/2020 | Naguib et al. | |
| 10,660,037 B2 | 5/2020 | Hariharan et al. | |
| 10,759,389 B2 | 9/2020 | Ledvina et al. | |
| 10,819,029 B2 | 10/2020 | Amiri et al. | |
| 11,354,913 B1 * | 6/2022 | Houston | G01S 17/931 |
| 11,568,690 B2 | 1/2023 | Einberg | |
| 2003/0232620 A1 | 12/2003 | Runkle et al. | |
| 2014/0266585 A1 | 9/2014 | Chao et al. | |
| 2014/0355582 A1 | 12/2014 | Kamath et al. | |
| 2015/0310681 A1 | 10/2015 | Avery et al. | |
| 2015/0332532 A1 | 11/2015 | Lee et al. | |
| 2016/0234008 A1 | 8/2016 | Hekstra et al. | |
| 2016/0241999 A1 | 8/2016 | Chin et al. | |
| 2016/0278006 A1 | 9/2016 | Lee et al. | |
| 2016/0316500 A1 | 10/2016 | Aliyar | |
| 2016/0353233 A1 | 12/2016 | Yong et al. | |
| 2016/0360341 A1 | 12/2016 | Srivatsa et al. | |
| 2017/0070919 A1 | 3/2017 | Verger et al. | |
| 2017/0151918 A1 | 6/2017 | Boesen | |
| 2017/0153636 A1 | 6/2017 | Boesen | |
| 2017/0158202 A1 | 6/2017 | Yang | |
| 2017/0232930 A1 | 8/2017 | Murar et al. | |
| 2017/0236346 A1 | 8/2017 | Murar et al. | |
| 2019/0097317 A1 | 3/2019 | Di Nallo et al. | |
| 2019/0098499 A1 | 3/2019 | Lerch et al. | |
| 2019/0116619 A1 | 4/2019 | Hauck et al. | |
| 2020/0053689 A1 | 2/2020 | Mcqueen et al. | |
| 2020/0150261 A1 | 5/2020 | Naguib et al. | |
| 2020/0180561 A1 * | 6/2020 | Lane | G06V 40/103 |
| 2020/0259522 A1 | 8/2020 | Hammerschmidt et al. | |
| 2020/0272148 A1 | 8/2020 | Karasev et al. | |
| 2020/0314651 A1 | 10/2020 | Pirch et al. | |
| 2020/0320188 A1 | 10/2020 | Graff et al. | |
| 2020/0351781 A1 | 11/2020 | Hariharan et al. | |
| 2021/0377738 A1 * | 12/2021 | Lüscher | G07C 9/00857 |

FOREIGN PATENT DOCUMENTS

| | | |
|---|---|---|
| CN | 107730663 | 2/2018 |
| CN | 109496288 | 3/2019 |
| CN | 110865403 | 3/2020 |
| CN | 116710731 | 9/2023 |
| EP | 2617242 | 10/2016 |
| EP | 3101874 | 12/2016 |
| JP | 6205237 | 9/2017 |
| JP | 2023552878 | 12/2023 |
| KR | 101077406 | 10/2011 |
| KR | 20170040240 | 4/2017 |
| WO | 2013178163 | 12/2013 |
| WO | 2016007627 | 1/2016 |
| WO | 2016059451 | 4/2016 |
| WO | 2017136725 | 8/2017 |
| WO | 2017144345 | 8/2017 |
| WO | 2020083750 | 4/2020 |
| WO | 2022128627 | 6/2022 |

OTHER PUBLICATIONS

"Korean Application Serial No. 10-2023-7023575, Voluntary Amendment filed Nov. 11, 2024", with English claims, 14 pages.

"International Application Serial No. PCT EP2021 084591, International Search Report mailed Mar. 28, 2022", 6 pgs.

"International Application Serial No. PCT EP2021 084591, Written Opinion mailed Mar. 28, 2022", 8 pgs.

Neil, Daniel, "Phased LSTM: Accelerating Recurrent Network Training for Long or Event-based Sequences", arXiv:1610.09513v1 [cs.LG], [Online] Retrieved from the Internet: URL:https: arxiv.org pdf 1610.09513.pdf, [retrieved on Mar. 15, 2022], (Oct. 29, 2016), 9 pgs.

Xue, Hao, "A Location-Velocity-Temporal Attention LSTM Model for Pedestrian Trajectory Prediction", IEEE 4 Access, IEEE, USA, vol. 8, [retrieved on Mar. 10, 2020], (Feb. 29, 2020), 44576-44589.

"International Application Serial No. PCT EP2021 084591, International Preliminary Report on Patentability mailed Jun. 29, 2023", 10 pages.

"European Application Serial No. 21836060.0, Communication Pursuant to Article 94(3) EPC mailed Jul. 2, 2025", 8 pgs.

"Japanese Application Serial No. 2023-535893, Notification of Reasons for Refusal mailed Jun. 24, 2025", w/ English Translation, 7 pgs.

"Japanese Application Serial No. 2023-535893, Response Filed Sep. 17, 2025 to Notification of Reasons for Refusal mailed Jun. 24, 2025", W/ English Claims, 12 pgs.

Hatta, Yuji, et al., "Vehicular-Collision Avoidance Support System (VCASS)", IEICE Technical Report vol. 104 No.691 IEICE Technical Report , IEICE The Institute of Electronics, Information and Communication Engineers, cited in Japanese Application Serial No. 2023-535893, Notification of Reasons for Refusal mailed Jun. 24, 2025, with English abstract, (2005), 6 pages.

(56) References Cited

OTHER PUBLICATIONS

"Chinese Application Serial No. 202180090559.6, Office Action mailed Oct. 28, 2025", with English translation, 32 pages.

Xue, H, "A Location-Velocity-Temporal Attention LSTM Model for Pedestrian Trajectory Prediction", IEEE Access, Apr. 21, 2020, 14 pgs.

"Indian Application Serial No. 202317045043, First Examination Report mailed Feb. 4, 2026", with English translation, 9 pages.

Qiao, Shaojie, "A Self Adaptive Parameter Selection Trajectory Prediction Approach via Hidden Markov Models", IEEE Transactions On Intelligent Transportation Systems, vol. 16, No. 1, Feb. 2015, 13 pages.

Rudenko, Andrey, "Human motion trajectory prediction a survey", May 15, 2019, 33 pages.

Yang, Jie-Ci, "An Intelligent Automated Door Control System Based on a Smart Camera", Sensors 2013, 13, May 10, 2013, 14 pages.

* cited by examiner

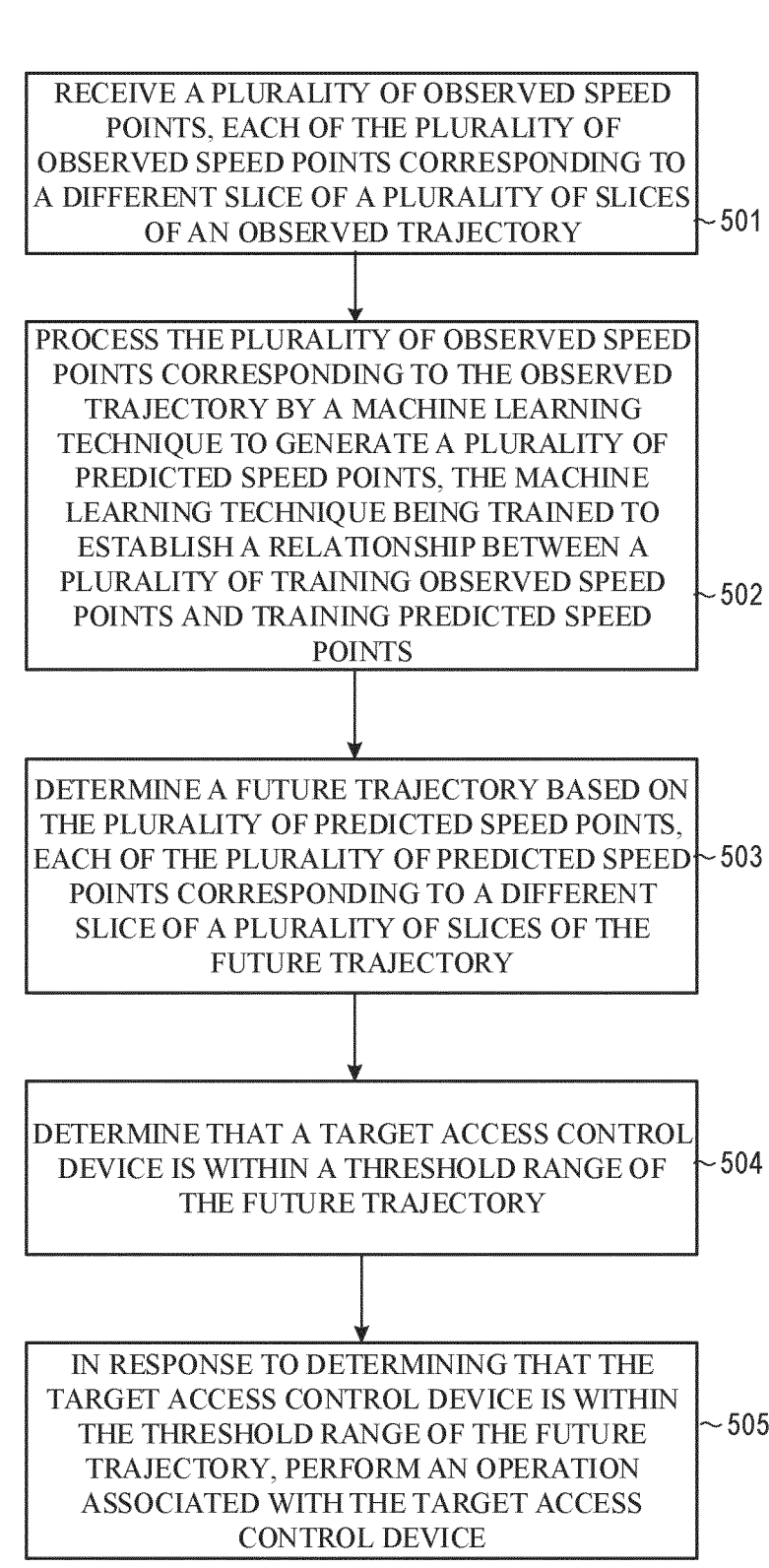

500

RECEIVE A PLURALITY OF OBSERVED SPEED POINTS, EACH OF THE PLURALITY OF OBSERVED SPEED POINTS CORRESPONDING TO A DIFFERENT SLICE OF A PLURALITY OF SLICES OF AN OBSERVED TRAJECTORY ~501

PROCESS THE PLURALITY OF OBSERVED SPEED POINTS CORRESPONDING TO THE OBSERVED TRAJECTORY BY A MACHINE LEARNING TECHNIQUE TO GENERATE A PLURALITY OF PREDICTED SPEED POINTS, THE MACHINE LEARNING TECHNIQUE BEING TRAINED TO ESTABLISH A RELATIONSHIP BETWEEN A PLURALITY OF TRAINING OBSERVED SPEED POINTS AND TRAINING PREDICTED SPEED POINTS ~502

DETERMINE A FUTURE TRAJECTORY BASED ON THE PLURALITY OF PREDICTED SPEED POINTS, EACH OF THE PLURALITY OF PREDICTED SPEED POINTS CORRESPONDING TO A DIFFERENT SLICE OF A PLURALITY OF SLICES OF THE FUTURE TRAJECTORY ~503

DETERMINE THAT A TARGET ACCESS CONTROL DEVICE IS WITHIN A THRESHOLD RANGE OF THE FUTURE TRAJECTORY ~504

IN RESPONSE TO DETERMINING THAT THE TARGET ACCESS CONTROL DEVICE IS WITHIN THE THRESHOLD RANGE OF THE FUTURE TRAJECTORY, PERFORM AN OPERATION ASSOCIATED WITH THE TARGET ACCESS CONTROL DEVICE ~505

FIG. 5

TRAJECTORY PREDICTION WITH DATA NORMALIZATION

PRIORITY APPLICATION

This application is a U.S. National Stage filing under 35 U.S.C. § 371 of PCT Patent Application No. PCT/EP2021/084591, filed on Dec. 7, 2021, which claims priority to U.S. Provisional Patent Application Ser. No. 63/125,041, filed Dec. 14, 2020, the disclosure of which are incorporated herein in their entirety by reference.

BACKGROUND

Trajectory prediction plays an important role in many tasks such as intelligent access control systems. It is generally defined as predicting positions of a movable agent (e.g., person, vehicle, or mobile device) at each time step within a predefined future time interval, based on observed partial trajectories over a certain period.

SUMMARY

In some aspects, a method is provided comprising: receiving, by one or more processors, a plurality of observed speed points, each of the plurality of observed speed points corresponding to a different slice of a plurality of slices of an observed trajectory; processing the plurality of observed speed points corresponding to the observed trajectory by a machine learning technique to generate a plurality of predicted speed points, the machine learning technique being trained to establish a relationship between a plurality of training observed speed points and training predicted speed points; determining a future trajectory based on the plurality of predicted speed points, each of the plurality of predicted speed points corresponding to a different slice of a plurality of slices of the future trajectory; determining that a target access control device is within a threshold range of the future trajectory; and in response to determining that the target access control device is within the threshold range of the future trajectory, performing an operation associated with the target access control device.

In some aspects, the plurality of observed speed points comprise acceleration measurements, the plurality of predicted speed points comprise a plurality of acceleration measurements, and the target access control device comprises a lock associated with a door; and wherein the performing the operation comprises unlocking the door.

In some aspects, the method includes establishing a wireless communication link between a mobile device of a user and the target access control device; exchanging authorization information over the wireless communication link; and performing the operation after determining that the user is authorized, based on the authorization information, to access the target access control device.

In some aspects, the method includes determining that the user is authorized, based on the authorization information, to access the target access control device prior to performing the operation; and delaying performing the operation after determining that the user is authorized until the target access control device is determined to be within the threshold range of the future trajectory.

In some aspects, the wireless communication link comprises a Bluetooth Low Energy (BLE) communication protocol; and wherein the plurality of observed speed points are received over an ultra-wideband (UWB) communication protocol.

In some aspects, the target access control device is located indoors.

In some aspects, the method includes determining that the user is authorized, based on the authorization information, to access the target access control device prior to performing the operation; and preventing performing the operation after determining that the user is authorized in response to determining that the target access control device is outside of the threshold range of the future trajectory.

In some aspects, the machine learning technique comprises a neural network.

In some aspects, the method includes receiving the plurality of observed speed points by: receiving a first data point representing a first two-dimensional (2D) or three-dimensional (3D) Cartesian coordinate at a first time point; receiving a second data point representing a second 2D or 3D Cartesian coordinate at a second time point, each of the first and second data points corresponding to a first slice of the plurality of slices; and computing a first observed speed point of the plurality of observed speed points as a function of a difference between the first and second 2D or 3D Cartesian coordinates and a difference between the first and second time points.

In some aspects, the machine learning technique generates the plurality of predicted speed points independently of a sampling rate of the plurality of observed speed points.

In some aspects, the method includes determining the future trajectory based on the plurality of predicted speed points by: determining a sampling rate at which the plurality of observed speed points are received based on a difference between a first timestamp of a first of the plurality of observed speed points and a second timestamp of a second of the plurality of observed speed points; and computing 2D or 3D Cartesian coordinates of the future trajectory based on the plurality of predicted speed points, a current location of a user, and the sampling rate at which the plurality of observed speed points is received.

In some aspects, the method includes training the machine learning technique by: obtaining a first batch of training data comprising a first set of the plurality of training observed speed points and a corresponding first set of the training predicted speed points; processing the first set of the training observed speed points with the machine learning technique to generate a plurality of estimated speed points; computing, based on a loss function, a loss based on a deviation between the plurality of estimated speed points and the corresponding first set of the training predicted speed points; and updating parameters of the machine learning technique based on the computed loss function.

In some aspects, the first set of the plurality of training observed speed points correspond to a first sampling rate, further comprising: obtaining a second batch of training data comprising a second set of the plurality of training observed speed points, wherein the second set of the plurality of training observed speed points correspond to a second sampling rate; processing the second set of the training observed speed points with the machine learning technique to generate a second plurality of estimated speed points; computing, based on the loss function, a second loss based on a deviation between the second plurality of estimated speed points and the corresponding first set of the training predicted speed points; and updating parameters of the machine learning technique based on the second loss.

In some aspects, a system is provided comprising: one or more processors coupled to a memory comprising non-transitory computer instructions that when executed by the one or more processors perform operations comprising:

receiving a plurality of observed speed points, each of the plurality of observed speed points corresponding to a different slice of a plurality of slices of an observed trajectory; processing the plurality of observed speed points corresponding to the observed trajectory by a machine learning technique to generate a plurality of predicted speed points, the machine learning technique being trained to establish a relationship between a plurality of training observed speed points and training predicted speed points; determining a future trajectory based on the plurality of predicted speed points, each of the plurality of predicted speed points corresponding to a different slice of a plurality of slices of the future trajectory; determining that a target access control device is within a threshold range of the future trajectory; and in response to determining that the target access control device is within the threshold range of the future trajectory, performing an operation associated with the target access control device.

In some aspects, the plurality of observed speed points comprise acceleration measurements, the plurality of predicted speed points comprise a plurality of acceleration measurements, the target access control device comprises a lock associated with a door; and the performing the operation comprises unlocking the door.

In some aspects, the operations further comprise: establishing a wireless communication link between a mobile device of a user and the target access control device; exchanging authorization information over the wireless communication link; and performing the operation after determining that the user is authorized, based on the authorization information, to access the target access control device.

In some aspects, the operations further comprise: determining that the user is authorized, based on the authorization information, to access the target access control device prior to performing the operation; and delaying performing the operation after determining that the user is authorized until the target access control device is determined to be within the threshold range of the future trajectory.

In some aspects, a non-transitory computer readable medium is provided comprising non-transitory computer-readable instructions for performing operations comprising: receiving a plurality of observed speed points, each of the plurality of observed speed points corresponding to a different slice of a plurality of slices of an observed trajectory; processing the plurality of observed speed points corresponding to the observed trajectory by a machine learning technique to generate a plurality of predicted speed points, the machine learning technique being trained to establish a relationship between a plurality of training observed speed points and training predicted speed points; determining a future trajectory based on the plurality of predicted speed points, each of the plurality of predicted speed points corresponding to a different slice of a plurality of slices of the future trajectory; determining that a target access control device is within a threshold range of the future trajectory; and in response to determining that the target access control device is within the threshold range of the future trajectory, performing an operation associated with the target access control device.

In some aspects, the plurality of observed speed points comprise acceleration measurements, the plurality of predicted speed points comprise a plurality of acceleration measurements, the target access control device comprises a lock associated with a door; and the performing the operation comprises unlocking the door.

In some aspects, the operations further comprise: establishing a wireless communication link between a mobile device of a user and the target access control device; exchanging authorization information over the wireless communication link; and performing the operation after determining that the user is authorized, based on the authorization information, to access the target access control device.

BRIEF DESCRIPTION OF THE DRAWINGS

FIG. 5 is a flowchart illustrating example operations of the access control system, according to example embodiments.

DETAILED DESCRIPTION

Figure 1:
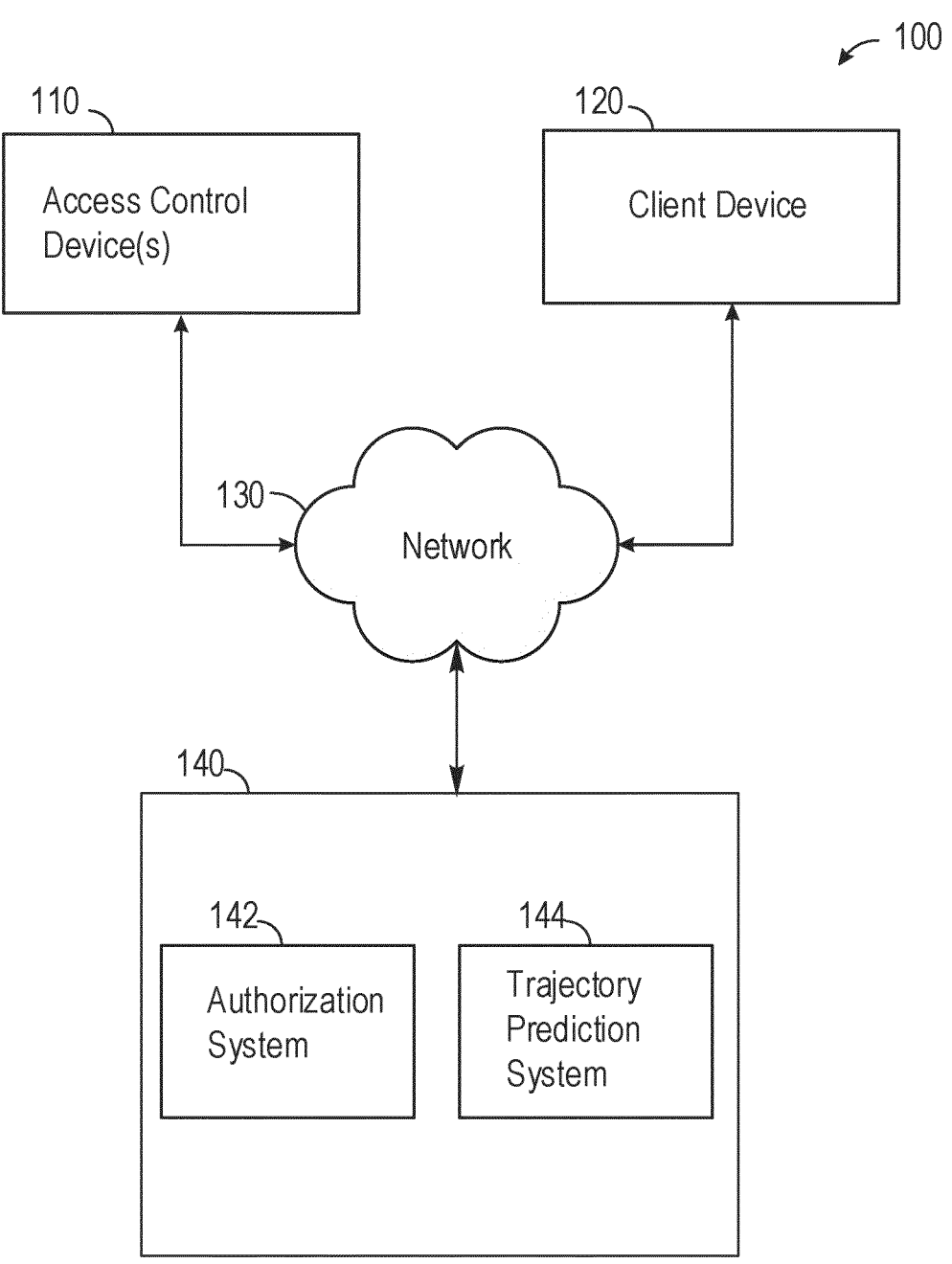
FIG. 1 is a block diagram of an example access control system, according to some embodiments.

Example methods and systems for an access control system (e.g., physical or logical access control system) based on trajectory prediction are described. In the following description, for purposes of explanation, numerous specific details are set forth in order to provide a thorough understanding of example embodiments. It will be evident, however, to one of ordinary skill in the art that embodiments of the disclosure may be practiced without these specific details.

In typical access control systems, a user carries a physical card or device that contains a set of credentials (e.g., authorization information). Such credentials are exchanged with a access control device (e.g., an electronic door lock, card reader, etc.) when the physical card or device is brought within about 20 centimeters (close proximity) to the access control device. At that point, the access control device determines if the credentials authorize the user to access the access control device and, if so, the access control device grants access (e.g., opens the door lock). While such systems generally work well, they require the user to be very close to the access control device to operate the access control device. This can introduce various latencies in operating the devices and can be frustrating to users.

As mobile devices become more common place, such mobile devices can be programmed to carry the same set of credentials as the physical cards that are typically used. These mobile devices can communicate with access control devices over longer distances, such as using a Bluetooth Low Energy (BLE) communication protocol. For example, the mobile devices can transmit and exchange the credentials with a access control device over a range of up to 100 meters. In such cases, the access control device can be operated when the user is at a greater distance away from the access control device than with the use of the physical card or device. This way, when the user finally reaches the access control device, the access control device has already received and authorized the credentials and has granted or denied access to the user. No further action is needed from the user to operate the device when the user reaches the device (e.g., the user need not bring the physical card in close proximity to the access control device).

These other approaches of exchanging credentials over BLE, though, introduce another problem. Namely, if there exist multiple access control devices within range of the BLE communication protocol, the credentials may be exchanged with a device that the user does not intend to operate. For example, there may exist multiple access control devices in range of the user's mobile device to which the user has credentials to access. However, the user may only intend to access one device. As another example, the user may pass by a given door or access control device that the user is authorized to access but may not intend to pass through or operate the given door or access control device. In such cases, determining the trajectory of the user can play an important role in determining which of the multiple correct physical access devices to operate and the user's intentions as to operating such devices.

Typical trajectory prediction systems receive a few steps of observed trajectories as input and generate several numbers of consecutive locations into the future timeline. Such typical trajectory prediction systems rely on data that is acquired at a particular known sampling frequency. This limits their general application because in real-world scenarios, real data is not ideal because different types of location sensors emit signals at different frequencies and sensors may suffer from inconsistent sampling rates due to hardware and communication limitations. Some trajectory prediction systems can be trained on multiple sampling frequencies, but this further increases their complexity and make them unsuitable for application on mobile devices and platforms.

The disclosed embodiments provide an intelligent solution, which can precisely forecast the future positions of the user so that the access control system can provide a proactive and seamless experience for users while maintaining high security. The disclosed embodiments provide a trajectory prediction system that predicts a trajectory of a user regardless of the sampling rate of the incoming or observed data or trajectory points. Based on the predicted trajectory, if a given access control device is within range of the trajectory and is authorized for access by a user (e.g., as determined by a long-range exchange of credentials, such as over BLE), the given access control device is operated. As an example, the given access control device (e.g., a door lock) can initially communicate with a mobile device of a user over one communication protocol (e.g., BLE) to exchange authorization data (e.g., credentials). If the given access control device is then determined to be within range of a predicted trajectory of the user, the given access control device is instructed to be operated (e.g., the door lock is opened). In this way, when the user reaches the given access control device, the given access control device is ready to be operated without the user having to bring a physical access card in close proximity to the given access control device.

In some embodiments, the disclosed embodiments provide systems and methods to perform long range access control based on trajectory prediction. According to the disclosed embodiments, a plurality of observed speed points is received. The plurality of observed speed points corresponding to an observed trajectory are processed by a machine learning technique to generate a plurality of predicted speed points. The machine learning technique is trained to establish a relationship between a plurality of training observed speed points and training predicted speed points. The disclosed embodiments determine a future trajectory based on the plurality of predicted speed points, with each of the plurality of predicted speed points corresponding to a different slice of a plurality of slices of the future trajectory and determine that a target access control device is within a threshold range of the future trajectory. In response to determining that the target access control device is within the threshold range of the future trajectory, the disclosed embodiments perform an operation associated with the target access control device.

In some embodiments, the disclosed embodiments provide systems and methods to perform long range access control based on trajectory prediction. According to the disclosed embodiments, a plurality of observed acceleration points is received. The plurality of observed acceleration points corresponding to an observed trajectory are processed by a machine learning technique to generate a plurality of predicted acceleration points. The machine learning technique is trained to establish a relationship between a plurality of training observed acceleration points and training predicted acceleration points. The disclosed embodiments determine a future trajectory based on the plurality of predicted acceleration points, with each of the plurality of predicted acceleration points corresponding to a different slice of a plurality of slices of the future trajectory and determine that a target access control device is within a threshold range of the future trajectory. In response to determining that the target access control device is within the threshold range of the future trajectory, the disclosed embodiments perform an operation associated with the target access control device.

By training the machine learning technique on multiple speed, acceleration, or velocity points to predict a speed or velocity, the disclosed embodiments can predict a future trajectory independent of the sampling rate at which the position coordinates of the observed trajectory are obtained or received. Namely, the machine learning technique computes a difference between three-dimensional (3D) coordinates of two 3D positions obtained at different times and divides that difference by the difference in the timestamps at which the 3D coordinates were received. This provides an overall speed for a set of slices along a given trajectory that is observed. This speed can then be processed to predict a future speed. The future trajectory can be determined by deriving future 3D coordinates based on an estimated or known sampling rate of the 3D positions. For example, each predicted speed measurement can be multiplied by the sampling rate (e.g., the amount of time between measurements) to identify a distance or predicted segment (e.g., corresponding to a difference between two predicted 3D coordinates). The predicted segment can be offset by the current position of the user that is known and can be assembled or combined with additional predicted 3D coordinates to generate a predicted trajectory.

In an alternate embodiment, the observed positions and future trajectories are in two-dimensional space and represented by 2D coordinates. For example, the machine learning technique computes a difference between 2D coordinates of two 2D positions obtained at different times and divides that difference by the difference in the timestamps at which the 2D coordinates were received. This provides an overall speed for a set of slices along a given trajectory that is observed. This speed can then be processed to predict a future speed. The future trajectory can be determined by deriving future 2D coordinates based on an estimated or known sampling rate of the 2D positions. For example, each predicted speed measurement can be multiplied by the sampling rate (e.g., the amount of time between measurements) to identify a distance or predicted segment (e.g., corresponding to a difference between two predicted 2D coordinates). The predicted segment can be offset by the current position of the user that is known and can be assembled or combined with additional predicted 2D coordinates to generate a predicted trajectory FIG. 1 is a block diagram showing an example system 100, according to various exemplary embodiments. The system 100 can be a access control system that includes a client device 120, one or more access control devices 110 that control access to a protected asset or resource, such as through a lockable door, and an authorization management system 140 that are communicatively coupled over a network 130 (e.g., Internet, BLE, ultra-wideband (UWB) communication protocol, telephony network, or other wired or wireless communication protocols).

UWB is a radio frequency (RF) technique that uses short, low-power pulses over a wide frequency spectrum. The pulses are on the order of millions of individual pulses per second. The width of the frequency spectrum is generally greater than 500 megahertz or greater than twenty percent of an arithmetic center frequency.

UWB can be used for communication, such as by encoding data via time modulation (e.g., pulse-position encoding). Here, symbols are specified by pulses on a subset of time units out of a set of available time units. Other examples of UWB encodings can include amplitude modulation and/or polarity modulation. The wide band transmission tends to be more robust to multipath fading than carrier-based transmission techniques. Further, the lower power of pulses at any given frequency tend to reduce interference with carrier-based communication techniques.

UWB can be used in radar operations, providing localization accuracies on the scale of tens of centimeters. Due to the possibly variable absorption and reflection of different frequencies in a pulse, both surface and obstructed (e.g., covered) features of an object can be detected. In some cases, the localization provides an angle of incidence in addition to distance.

The client device 120 and the access control devices 110 can be communicatively coupled via electronic messages (e.g., packets exchanged over the Internet, BLE, UWB, WiFi Direct, or any other protocol). While FIG. 1 illustrates a single access control device 110 and a single client device 120, it is understood that a plurality of access control devices 110 and a plurality of client devices 120 can be included in the system 100 in other embodiments. As used herein, the term "client device" may refer to any machine that interfaces to a communications network (such as network 130) to exchange credentials with an access control device 110, the authorization management system 140, another client device 120 or any other component to obtain access to the asset or resource protected by the access control device 110. In some embodiments, the client device 120 can use UWB to obtain location information and compute speed, velocity, and/or acceleration information for a current trajectory of the client device 120. The client device 120 can obtain the location information and compute the speed, velocity, and/or acceleration information and can provide such information to the authorization management system 140. In some embodiments, the access control devices 110 can use UWB to obtain location information and compute speed, velocity, and/or acceleration information for a current trajectory of a given client device 120 or set of client devices 120. The access control devices 110 can obtain the location information and compute the speed, velocity, and/or acceleration information and can provide such information to the authorization management system 140.

In some cases, some or all of the components and functionality of the authorization management system 140 can be included in the client device 120 (e.g., any of the machine learning techniques discussed in relation to the authorization management system 140 can be implemented on respective client devices 120). Any component that performs trajectory prediction in the system 100 can be implemented as a standalone component of any one of the authorization management system 140, client device 120, or the access control device 110. The functions of any component that performs trajectory prediction in the system 100 can be implemented in a distributed manner across any one of the authorization management system 140, client device 120, and/or the access control device 110.

A client device 120 may be, but is not limited to, a mobile phone, desktop computer, laptop, portable digital assistant (PDA), smart phone, a wearable device (e.g., a smart watch), tablet, ultrabook, netbook, laptop, multi-processor system, microprocessor-based or programmable consumer electronics, or any other communication device that a user may use to access a network.

The access control device 110 can include an access reader device connected to a resource (e.g., a door locking mechanism or backend server) that controls the resource (e.g., door locking mechanism). The resource associated with the access control device 110 can include a door lock, an ignition system for a vehicle, or any other device that grants or denies access to a physical component and that can be operated to grant or deny access to the physical component. For example, in the case of a door lock, the access control device 110 can deny access, in which case the door lock remains locked and the door cannot be opened, or can grant access, in which case the door lock becomes unlocked to allow the door to be opened. As another example, in the case of an ignition system, the access control device 110 can deny access in, which case the vehicle ignition system remains disabled and the vehicle cannot be started, or can grant access, in which case the vehicle ignition becomes enabled to allow the vehicle to be started.

Physical access control covers a range of systems and methods to govern access, for example by people, to secure areas or secure assets. Physical access control includes identification of authorized users or devices (e.g., vehicles, drones, etc.) and actuation of a gate, door, or other facility used to secure an area or actuation of a control mechanism, e.g., a physical or electronic/software control mechanism, permitting access to a secure asset. The access control device 110 forms part of physical access control systems (PACS), which can include a reader (e.g., an online or offline reader) that may hold authorization data and can be capable of determining whether credentials (e.g., from credential or key devices such as radio frequency identification (RFID) chips in cards, fobs, or personal electronic devices such as mobile phones) are authorized for an actuator or control mechanism (e.g., door lock, door opener, software control mechanism, turning off an alarm, etc.), or PACS can include a host server to which readers and actuators are connected (e.g., via a controller) in a centrally managed configuration. In centrally managed configurations, readers can obtain credentials from credential or key devices and pass those credentials to the PACS host server or headend system. The host server then determines whether the credentials authorize access to the secure area or secure asset and commands the actuator or other control mechanism accordingly. While examples in physical access control are used herein, the disclosure applies equally to logical access control system (LACS) use cases (e.g., logical access to personal electronic devices, rider identification in transport services, access and asset control in unmanned store, etc.).

Wireless access control systems, e.g., those that utilize wireless communication between the reader and the credential or key device, can use RFID or personal area network (PAN) technologies, such as the IEEE 802.15.1, Bluetooth, BLE, near field communications (NFC), ZigBee, GSM, CDMA, Wi-Fi, etc. Many of these technologies have drawbacks for a seamless user experience. For example, the range of NFC is so short that credential exchange typically does not happen until the user is very near the secure area or asset and attempts to gain access. The credential transfer to the reader and response by the reader or host server can take several seconds, resulting in a frustrating user experience. Further, the user generally must remove the device from a pocket, for example, and place it on or very near the reader for the process to begin.

On the other hand, BLE devices have a range of tens of meters (e.g., ten to twenty meters). Thus, credential exchange can be accomplished as the user approaches the reader. However, BLE, as well as many other PAN standards, do not offer accurate physical tracking of devices (e.g., ranging, positioning, etc.). Thus, it can be difficult for the reader to determine whether the user actually intends to gain access to the secure area or asset without some additional evidence of intent. It is problematic, for example, if an authorized user merely passed by the reader in a hall and the door was unlocked, or even opened. Evidence of intent can include such things as touching a door handle, gesturing with the key-device, and so forth. This, however, can be a less than ideal user experience when compared with a user simply walking up to the reader and gaining access to the secured area without further action or interaction on the part of the user.

To help address one or more of these or other issues, localization techniques (e.g., using secure UWB ranging) can be used and can be combined with PAN discovery and key exchange. Localization techniques of UWB can be more accurate than some conventional techniques and can, for example, be accurate to the tens of centimeters. UWB localization techniques may provide both range and direction of the credential or key device with respect to the reader. This accuracy far surpasses the roughly ten-meter accuracy of, for example, BLE when readers are not coordinated. The precision of UWB accuracy can be a useful tool in seamlessly determining user intent (e.g., whether the user is attempting to access the secure area or asset, or is simply passing by) and a current or predicted trajectory of the user. For example, several zones can be defined, such as near the reader, at the reader, etc., to provide different contexts for understanding user intent. Additionally, or alternatively, the accuracy of the tracking helps to provide an accurate model of user motion or the direction of movement of the user from which intent can be discerned. Thus, the reader can categorize user motion as, for example, likely approaching the reader or simply walking past.

Once the intent trigger occurs, the reader may act on the credentials exchanged, for example, via a PAN technology. For an offline reader, e.g., a reader not connected to a control panel or host server, the reader may directly control the actuator or other control mechanism (e.g., a lock on a disconnected door). In a centrally managed access control system, an (online) reader may forward the credentials to a control panel or host server to act upon.

In general, the access control device 110 can include one or more of a memory, a processor, one or more antennas, a communication module, a network interface device, a user interface, and a power source or supply.

The memory of the access control device 110 can be used in connection with the execution of application programming or instructions by the processor of the access control device 110, and for the temporary or long-term storage of program instructions or instruction sets and/or credential or authorization data, such as credential data, credential authorization data, or access control data or instructions. For example, the memory can contain executable instructions that are used by the processor to run other components of access control device 110 and/or to make access determinations based on credential or authorization data. The memory of the access control device 110 can comprise a computer readable medium that can be any medium that can contain, store, communicate, or transport data, program code, or instructions for use by or in connection with access control device 110. The computer readable medium can be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), Dynamic RAM (DRAM), any solid-state storage device, in general, a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

The processor of the access control device 110 can correspond to one or more computer processing devices or resources. For instance, the processor can be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor can be provided as a microprocessor, Central Processing Unit (CPU), or plurality of microprocessors or CPUs that are configured to execute instructions sets stored in an internal memory and/or memory of the access control device 110.

The antenna of the access control device 110 can correspond to one or multiple antennas and can be configured to provide for wireless communications between access control device 110 and a credential or key device (e.g., client device 120). The antenna can be arranged to operate using one or more wireless communication protocols and operating frequencies including, but not limited to, the IEEE 802.15.1, Bluetooth, BLE, NFC, ZigBee, GSM, CDMA, Wi-Fi, RF, UWB, and the like. By way of example, the antenna(s) can be RF antenna(s), and as such, may transmit/receive RF signals through free-space to be received/transferred by a credential or key device having an RF transceiver. In some cases, at least one antenna is an antenna designed or configured for transmitting and/or receiving UWB signals (referred to herein for simplicity as a "UWB antenna") such that the reader can communicate using UWB techniques with the client device 120.

A communication module of the access control device 110 can be configured to communicate according to any suitable communications protocol with one or more different systems or devices either remote or local to access control device 110, such as one or more client devices 120 and/or authorization management system 140.

The network interface device of the access control device 110 includes hardware to facilitate communications with other devices, such as a one or more client devices 120 and/or authorization management system 140, over a communication network, such as network 130, utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, wireless data networks (e.g., IEEE 802.11 family of standards known as Wi-Fi, IEEE 802.16 family of standards known as WiMax), IEEE 802.15.4 family of standards, and peer-to-peer (P2P) networks, among others. In some examples, network interface device can include an Ethernet port or other physical jack, a Wi-Fi card, a Network Interface Card (NIC), a cellular interface (e.g., antenna, filters, and associated circuitry), or the like. In some examples, network interface device can include a plurality of antennas to wirelessly communicate using at least one of single-input multiple-output (SIMO), multiple-input multiple-output (MIMO), or multiple-input single-output (MISO) techniques.

A user interface of the access control device 110 can include one or more input devices and/or display devices. Examples of suitable user input devices that can be included in the user interface include, without limitation, one or more buttons, a keyboard, a mouse, a touch-sensitive surface, a stylus, a camera, a microphone, etc. Examples of suitable user output devices that can be included in the user interface include, without limitation, one or more LEDs, an LCD panel, a display screen, a touchscreen, one or more lights, a speaker, and so forth. It should be appreciated that the user interface can also include a combined user input and user output device, such as a touch-sensitive display or the like.

The network 130 may include, or operate in conjunction with, an ad hoc network, an intranet, an extranet, a virtual private network (VPN), a LAN, a wireless network, a wireless LAN (WLAN), a wide area network (WAN), a wireless WAN (WWAN), a metropolitan area network (MAN), BLE, UWB, the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project including 3G, fourth generation wireless (4G) networks, fifth generation wireless (5G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other short range or long range protocols, or other data transfer technology.

In an example, as the client device 120 approaches the access control device 110 (e.g., comes within range of a BLE communication protocol), the client device 120 transmits credentials of the client device 120 over the network 130. In some cases, the credentials can be selected from a plurality of credentials based on a current geographical location of the client device 120. For example, multiple credentials each associated with a different geographical location can be stored on the client device 120. When the client device 120 comes within a certain distance of a geographical location associated with one of the credentials (e.g., within 10 meters), the client device 120 retrieves the associated credentials from local memory.

In one example, the client device 120 provides the credentials directly to the access control device 110. In such cases, the access control device 110 communicates with the authorization management system 140 the credentials. The authorization management system 140 in FIG. 1 includes the authorization system 142 and the trajectory prediction system 144. The authorization management system 140 can further include elements described with respect to FIGS. 6 and 7, such as a processor and memory, having instructions stored thereon, that when executed by the processor, causes the processor to control the functions of the authorization management system 140.

The authorization management system 140 searches a list of credentials stored in the authorization system 142 to determine whether the received credentials match credentials from the list of authorized credentials for accessing a secure asset or resource (e.g., door or secure area) protected by the access control device 110. In response to determining that the received credentials are authorized to access the access control device 110, the authorization management system 140 accesses the trajectory prediction system 144 to determine whether the trajectory of the client device 120 is predicted to be within a specified range (e.g., 2 meters) of the access control device 110, as discussed in more detail below. Once the trajectory prediction system 144 indicates to the authorization management system 140 that the client device 120 is predicted to follow a trajectory that is within the specified range of the access control device 110, the authorization management system 140 instructs the access control device 110 to perform an operation granting access for the client device 120 (e.g., instructing the access control device 110 to unlock a lock of a door).

In another example, the client device 120 provides the credentials to the authorization management system 140. The authorization management system 140 searches a list of credentials stored in the authorization system 142 to determine whether the received credentials match credentials from the list of authorized credentials for accessing a secure asset or resource (e.g., door or secure area) protected by the access control device 110. In response to determining that the received credentials are authorized to access the access control device 110, the authorization management system 140 accesses the trajectory prediction system 144 to determine whether the trajectory of the client device 120 is predicted to be within a specified range (e.g., 2 meters) of the access control device 110, as discussed in more detail below. Once the trajectory prediction system 144 indicates to the authorization management system 140 that the client device

120 is predicted to follow a trajectory that is within the specified range of the access control device 110, the authorization management system 140 instructs the access control device 110 (associated with the received credentials and within a geographical distance of the client device 120) to perform an operation granting access to the client device 120 (e.g., instructing the access control device 110 to unlock a lock of a door).

The trajectory prediction system 144 trains a machine learning technique implemented by the authorization management system 140 to predict a speed, velocity, and/or acceleration for a client device 120 based on a set or collection of observed speed, velocity and/or acceleration measurements. The trajectory prediction system 144 applies a function to the predicted speed, velocity, and/or acceleration to generate a predicted trajectory or path along which the client device 120 is predicted to travel.

The trajectory prediction system 144 receives a plurality of training observed speed, velocity, and/or acceleration measurements and corresponding sets of training predicted measurements (e.g., speed, velocity, and/or acceleration measurements that are observed following one or more speed, velocity, and/or acceleration measurements). As explained in more detail in connection with FIG. 3, the trajectory prediction system 144 processes pairs of training observed speed, velocity, and/or acceleration measurements and ground-truth speed measurements (for positions that follow the observed speed, velocity and/or acceleration measurements) to train a machine learning technique. For example, the machine learning technique (e.g., a neural network) estimates an estimated speed, velocity, and/or acceleration for a given observed speed, velocity, and/or acceleration. The neural network compares the estimated speed, velocity, and/or acceleration with the corresponding ground-truth speed, velocity, and/or acceleration measurement to generate an error. Using a loss function and based on the error, the neural network is updated and applied to another set of training observed speed measurements and ground truth speed measurements. The neural network parameters are again adjusted and when the loss function satisfies a stopping criterion, the neural network is trained and utilized by the trajectory prediction system 144 to predict a speed, velocity, and/or acceleration measurement given a set of observed speed, velocity, and/or acceleration measurements. The machine learning techniques, discussed herein include neural networks, such as Long-Short Term Memory Neural Networks (LSTM), an autoencoder, a variational auto-encoder, a conditioned variational auto-encoder, a convolutional neural network, a radial basis network, a deep feed-forward network, a recurrent neural network, a gated recurrent unit, a denoising autoencoder, a sparse autoencoder, a Markov chain, a Hopfield network, a Boltzmann machine, a deep belief network, a deep convolutional network, a deconvolutional neural network, a generative adversarial network, a liquid state machine, an extreme learning machine, an echo state network, a deep residual network, a support vector machine, a Korhonen network, or any combination thereof.

For example, the trajectory prediction system 144 receives one or more observed speed, velocity and/or acceleration measurements from the client device 120. For example, the trajectory prediction system 144 receives observed speed, velocity and/or acceleration at previous time steps:

$$\Gamma_{obs} = \{S_i^1, \dots S_i^T\}$$

and predicts a speed, velocity and/or acceleration at each future time step:

$$\Gamma_{pred} = \{S_i^{T+1}, \dots S_i^{T+T'}\}.$$

T and T' denote the sequence length (or slice length) of the past and predicted trajectories, respectively. The observation inputs and prediction outputs of i at time step t are characterized by the speed vectors in the 3D Cartesian coordinate system or space as $$S_i^t = (sx_i^t, sy_i^t, sz_i^t)$$

in which the original Cartesian coordinates are normalized as speed, velocity and/or acceleration information:

$$sx_i^t = \frac{x_t - t_{t-1}}{\Delta t}, \, sy_i^t = \frac{y_t - y_{t-1}}{\Delta t}, \, sz_i^t = \frac{z_t - z_{t-1}}{\Delta t}.$$

In one example, the client device 120 (or, in the alternative, the access device 110) uses UWB (optionally in combination with one or more other location measurement techniques) to compute a current 3D coordinate of the client device 120. In some cases, the client device 120 (or, in the alternative, the access device 110) computes the 3D coordinates using UWB. In some cases, after collecting the sequential 3D coordinates, the client device 120 (or, in the alternative, the access device 110) applies denoising and/or smoothing techniques to the sequential 3D coordinates before converting to speed features. Such denoising and/or smoothing techniques can include: Kalman Filter, moving average, polynomial regression, locally weighted scatterplot smoothing, and/or Gaussian smoothing.

After collecting two sequential 3D coordinates (and optionally denoising and smoothing the 3D coordinates), each associated with a respective timestamp, the client device 120 (or, in the alternative, the access device 110) computes a difference between the two 3D coordinates (e.g., along the x-axis, y-axis, and z-axis). The client device 120 (or, in the alternative, the access device 110) divides that difference by a difference of the respective timestamps of the two 3D coordinates to determine an observed speed of the client device 120 along a given path or trajectory $$\left(e.g., \text{ to compute } sx_i^t = \frac{x_t - t_{t-1}}{\Delta t}, \, sy_i^t = \frac{y_t - y_{t-1}}{\Delta t}, \, sz_i^t = \frac{z_t - z_{t-1}}{\Delta t}\right).$$

Namely, the difference between the two 3D coordinates provides a distance of travel in 3D along an observed trajectory and the division of that distance by the timestamps indicates the speed of travel. In some cases, the speed of travel measured at two particular points can be used to compute an acceleration measurement. For example, a difference between the speed measurements divided by the difference between the timestamps can provide the acceleration for a particular time point or segment.

The client device 120 computes additional speed, velocity and/or acceleration measurements for additional sequential 3D coordinates of a set of 3D coordinates and provides these speed, velocity, and/or acceleration measurements to the trajectory prediction system 144 as the observed speed, velocity and/or acceleration along an observed trajectory. In some cases, the client device 120 also provides to the trajectory prediction system 144 the average sampling rate (e.g., the average of the differences in the timestamps that are used to compute the respective speed measurements). The trajectory prediction system 144 predicts a future speed of travel (e.g., $$\Gamma_{pred} = \{S_i^{T+1}, \dots S_i^{T+T'}\})$$

for the given set of observed speed measurements (e.g., $$\Gamma_{obs} = \{S_i^1, \dots S_i^T\}).$$

The trajectory prediction and/or speed, velocity, and/or acceleration prediction, discussed herein, can be performed at the client device 120, the access control device 110, at the authorization management system 140, or any combination thereof.

Once the trajectory prediction system 144 predicts a speed, velocity, and/or acceleration measurement or set of speed, velocity, and/or acceleration measurements, the trajectory prediction system 144 obtains the sampling rate from the client device 120 (or in the alternative the access device 110). The sampling rate indicates the length of time between the collection of each 3D coordinate that the client device 120 observed. In some cases, the sampling rate is fixed and known, and in other cases, the sampling rate is computed by the client device 120 in real-time as the 3D coordinates are collected. The trajectory prediction system 144 computes corresponding future segments along a predicted path based on the predicted speed, velocity and/or acceleration measurements and the sampling rate obtained from the client device 120. For example, the trajectory prediction system 144 multiplies a first predicted speed, velocity and/or acceleration measurement by the sampling rate to obtain a predicted 3D distance of travel or predicted segment or slice of a predicted trajectory. The trajectory prediction system 144 then multiplies a second predicted speed measurement by the sampling rate to obtain a second predicted 3D distance of travel or predicted segment or slice of the predicted trajectory. The trajectory prediction system 144 combines the predicted segments or slices together to form a predicted path or trajectory along which the client device 120 is predicted to travel.

In an alternate embodiment, once the trajectory prediction system 144 predicts a speed, velocity, and/or acceleration measurement or set of speed, velocity, and/or acceleration measurements, the trajectory prediction system 144 obtains the sampling rate from the client device 120 (or in the alternative the access device 110). The sampling rate indicates the length of time between the collection of each 2D coordinate that the client device 120 observed. In some cases, the sampling rate is fixed and known, and in other cases, the sampling rate is computed by the client device 120 in real-time as the 2D coordinates are collected. The trajectory prediction system 144 computes corresponding future segments along a predicted path based on the predicted speed, velocity and/or acceleration measurements and the sampling rate obtained from the client device 120. For example, the trajectory prediction system 144 multiplies a first predicted speed, velocity and/or acceleration measurement by the sampling rate to obtain a predicted 2D distance of travel or predicted segment or slice of a predicted trajectory. The trajectory prediction system 144 then multiplies a second predicted speed measurement by the sampling rate to obtain a second predicted 2D distance of travel or predicted segment or slice of the predicted trajectory. The trajectory prediction system 144 combines the predicted segments or slices together to form a predicted path or trajectory along which the client device 120 is predicted to travel.

The trajectory prediction system 144 obtains a specified range of activation or operation of the access control device 110. In one example, where the trajectory prediction system 144 is implemented on a server remote from the access control device 110, the trajectory prediction system 144 obtains a unique identifier of the access control device 110 and searches the access control devices range(s) 430 stored in database 400 (FIG. 4) to identify and retrieve the range associated with the unique identifier of the access control device 110. Different access control devices 110 or types of access control devices 110 can be associated with different ranges of activation or operation and each is stored with its respective unique identifier in the access control device range(s) 430. In some cases, the access control device range(s) 430 stores device types with respective ranges. In such circumstances, the device type is used to retrieve the associated range from the access control device range(s) 430 rather than the unique identifier. The trajectory prediction system 144 determines whether the predicted trajectory falls within the specified range of the access control device 110. If so, the trajectory prediction system 144 instructs the authorization management system 140 to activate or operate the access control device 110 to grant access for the client device 120.

In another example, the trajectory prediction system 144 is implemented locally on the access control device 110. In such cases, the access control device 110 is hard programmed with a corresponding range of activation (e.g., the range stored in the access control devices range(s) 430 for the access control device 110). The trajectory prediction system 144 implemented on the access control device 110 determines whether the predicted trajectory falls within the hard coded range. If so, the trajectory prediction system 144 causes the access control device 110 to grant access for the client device 120. In another example, the trajectory prediction system 144 is implemented on the client device 120 and provides the trajectory prediction to the access control device 110. The access control device 110 then determines whether the client device 120 is within a range associated with the access control device 110 to grant/deny access for the client device 120.

In some cases, the trajectory prediction system 144 does not access any range information, but simply provides the predicted trajectory or set of trajectories to the authorization management system 140, client device 120, and/or access control device 110. These devices collectively or individually then make a decision as to whether the predicted trajectory is within the threshold range.

Figure 2:
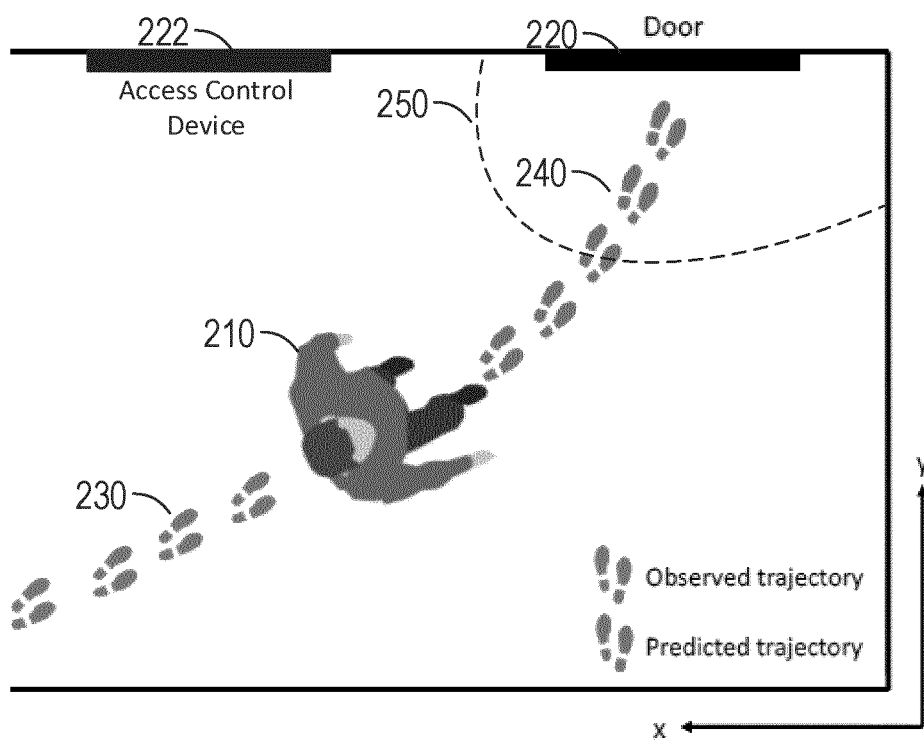
FIG. 2 illustrates an example access control system based on trajectory prediction, according to exemplary embodiments.

FIG. 2 illustrates an example access control system 200 based on trajectory prediction, according to exemplary embodiments. For example, a user 210 may be carrying a client device 120 (not shown), such as a mobile device or phone. The client device 120 may collect a set of observed 3D coordinates 230. The client device 120 may compute respective speed measurements for each pair of adjacent 3D coordinates based on respective timestamps of the coordinates. In another embodiment, the speed information can be measured by the access control device 110 instead of, or in addition to, the client device 120.

The client device 120 may determine that two access control devices 220 and 222 are within a specified range of the client device 120. For example, each of the access control devices 220 and 222 are within a range of BLE communication with the client device 120. In response, the client device 120 retrieves credentials of both of the access control devices 220 and 222 and transmits those credentials to the authorization management system 140. The authorization management system 140 determines that the client device 120 is authorized to access both of the access control devices 220 and 222. In response, the authorization management system 140 delays granting access to a particular one of the access control devices 220 or 222 until the client device 120 is determined to be traveling along a predicted trajectory that is within a particular range 250 of the respective access control devices 220 or 222.

In another example, there may be a single access control device 110 that secures access to an area protected by the single access control device 110. In such cases, the intent of the user to enter the secure area is determined prior to instructing the access control device 110 to grant access for the given client device 120. Specifically, a determination is made as to whether the predicted trajectory of the user falls within range of the access control device 110 prior to instructing the access control device 110 to grant access to the client device 120.

For example, the client device 120 provides the observed speed, velocity, and/or acceleration measurements to the trajectory prediction system 144. The trajectory prediction system 144 predicts speed, velocity, and/or acceleration measurements from the observed speed, velocity, and/or acceleration measurements. The trajectory prediction system 144 then computes a predicted trajectory 240 along which the client device 120 is predicted to travel based on a sampling rate or estimated sampling rate of the client device 120 and/or the access control device 110. In response to determining that the predicted trajectory 240 falls within range of a first access control device 220, the trajectory prediction system 144 instructs the authorization management system 140 to cause the first access control device 220 to grant access for the client device 120 (e.g., the first access control device 220 is instructed to perform an operation, such as unlocking an electronic door lock). In response to determining that the predicted trajectory 240 fails to fall within range of a second access control device 222, the trajectory prediction system 144 instructs the authorization management system 140 to cause the second access control device 222 to deny access for the client device 120 (e.g., the second access control device 222 is instructed to remain locked even though the credentials of the client device 120 are authorized to access the second access control device 222).

Figure 3:
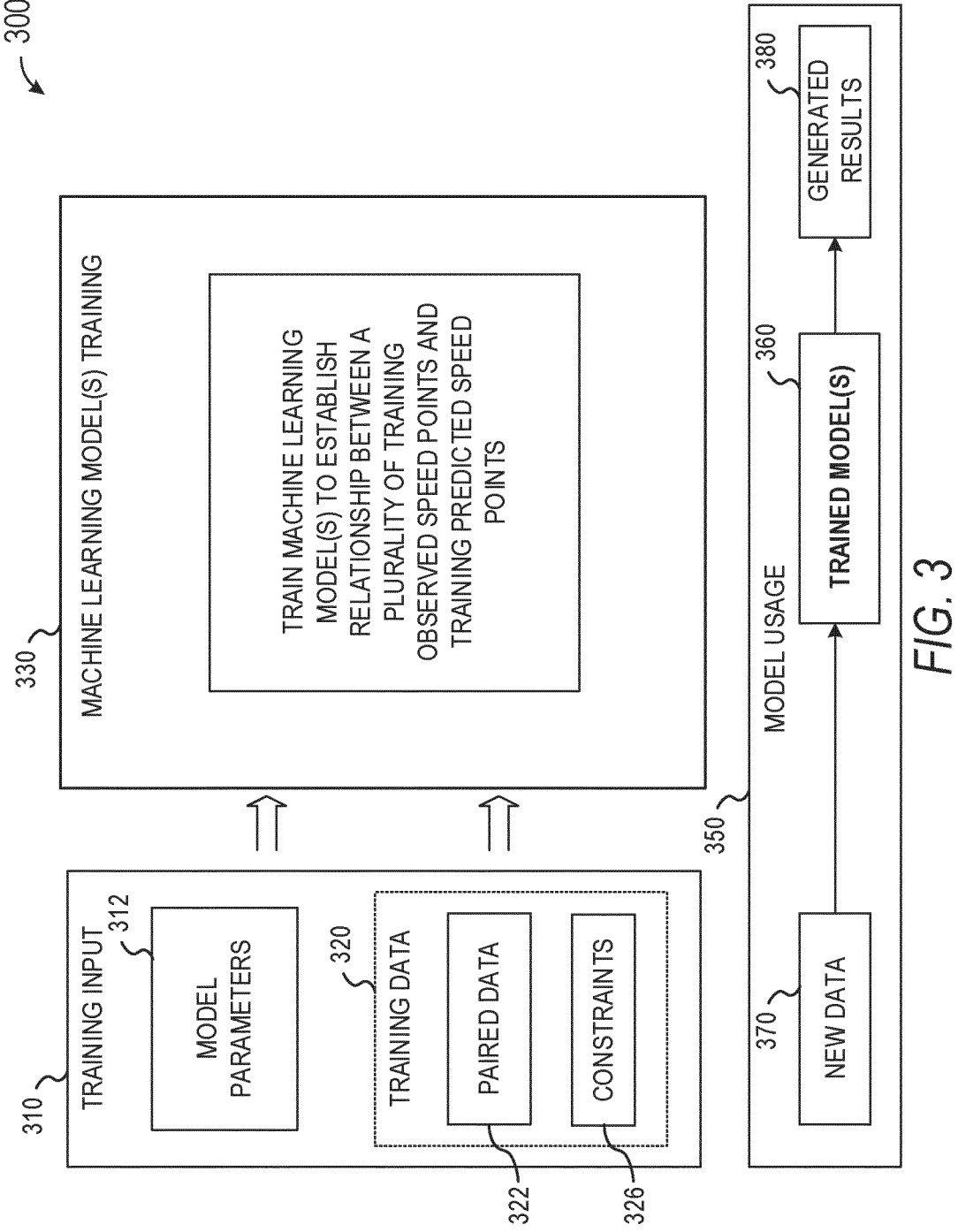
FIG. 3 is a block diagram of an example trajectory prediction system that may be deployed within the access control system of FIG. 1, according to some embodiments.

FIG. 3 is a block diagram 300 of an example trajectory prediction system 144 that may be deployed within the system of FIG. 1, according to some embodiments. Training input 310 includes model parameters 312 and training data 320, which may include paired training data sets 322 (e.g., input-output training pairs) and constraints 326. Model parameters 312 store or provide the parameters or coefficients of corresponding ones of machine learning models. During training, these parameters 312 are adapted based on the input-output training pairs of the training data 320. After the parameters 312 are adapted (after training), the parameters are used by trained models 360 to implement the trained machine learning (ML) models on a new set of data 370.

Training data 320 includes constraints 326, which may define the constraints of a given trajectory. The paired training data 320 may include sets of input-output pairs 322, such as pairs of a plurality of training observed speed, velocity, and/or acceleration measurements and corresponding training future speed, velocity, and/or acceleration measurements (ground truth speed, velocity and/or acceleration measurements). The ground truth speed, velocity, and/or acceleration measurements represent the actual measured speed, velocity, and/or acceleration at one or more future points in time that follow an observed speed, velocity, and/or acceleration measured at earlier points in time. For example, an observed speed measurement can be obtained at a first time point for a first segment of a path. A ground truth speed measurement represents the actual observed speed, velocity, and/or acceleration measured at a second time point for a second segment that follows the first segment. Some components of training input 310 may be stored separately at a different off-site facility or facilities than other components of training input 310.

Machine learning model(s) training 330 trains one or more machine learning techniques based on the sets of input-output pairs of paired training data 322. For example, the model training 330 may train the ML model parameters 312 by minimizing a loss function based on one or more ground-truth speed measurements. Particularly, the ML model can be applied to a training set of observed speed, velocity, and/or acceleration measurements along an observed path or trajectory to estimate speed measurements along a future path or trajectory. In some implementations, a derivative of a loss function is computed based on a comparison of the estimated speed measurements and the ground truth speed measurements, and parameters of the ML model are updated based on the computed derivative of the loss function.

The result of minimizing the loss function for multiple sets of training data trains, adapts, or optimizes the model parameters 312 of the corresponding ML models. In this way, the ML model is trained to establish a relationship between a plurality of training observed speed, velocity, and/or acceleration measurements and a corresponding plurality of predicted speed, velocity, and/or acceleration measurements.

Figure 4:
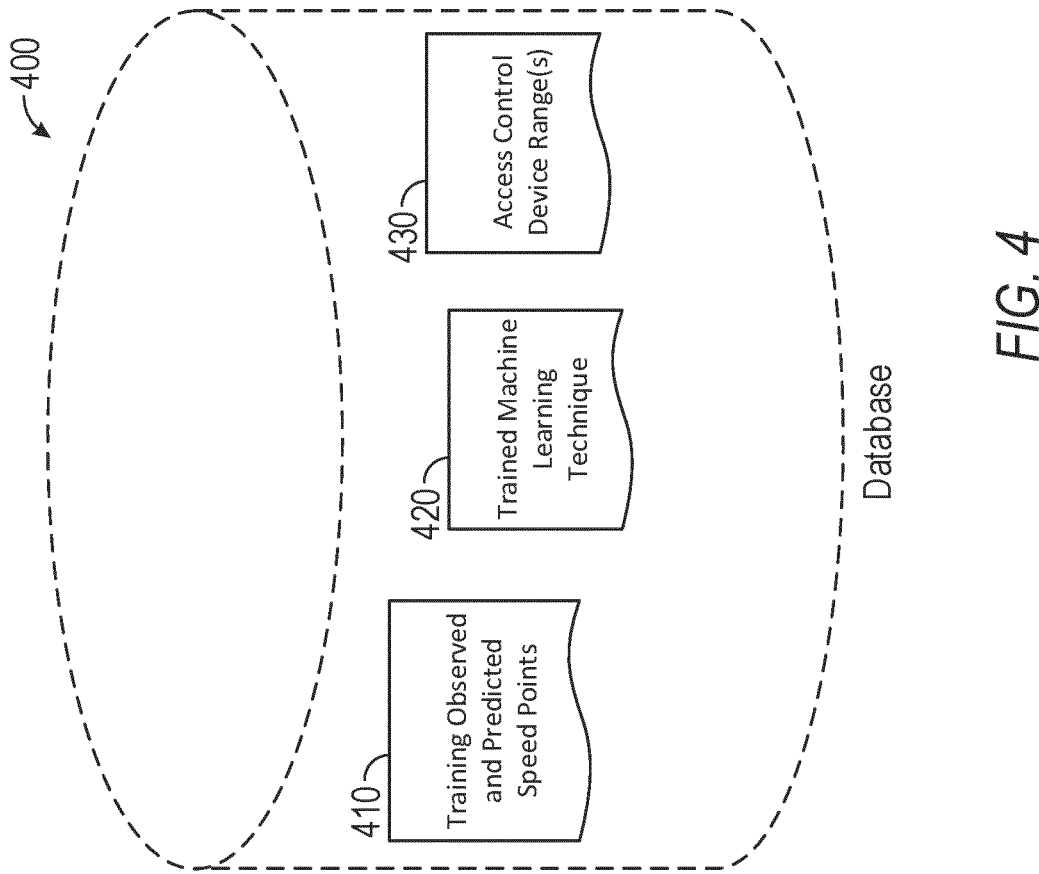
FIG. 4 is an example database that may be deployed within the system of FIGS. 1-3, according to some embodiments.

The ML model is trained in one implementation according to supervised learning techniques to estimate speed measurements from training speed measurements. In such cases, to train the ML model, a plurality of training observed speed, velocity, and/or acceleration measurements are retrieved together with their corresponding training predicted or estimated speed, velocity, and/or acceleration measurements. For example, the training observed speed, velocity, and/or acceleration measurements are retrieved from training observed and predicted speed points 410 stored in database 400 (FIG. 4). The ML model is applied to a first batch of training speed, velocity, and/or acceleration measurements to estimate a given set of speed, velocity, and/or acceleration measurements. The batch of the training speed measurements can be used to train the ML model with the same parameters of the ML model and may range from one training speed, velocity, and/or acceleration measurement to all of the training speed, velocity, and/or acceleration measurements. In some implementations, the output or result of the ML model is used to compute or predict a first speed, velocity, and/or acceleration measurement and a predicted 3D coordinate of a predicted trajectory based on a known or computed sampling rate.

The estimated speed, velocity, and/or acceleration measurement is applied to a loss function and a gradient or derivative of the loss function is computed based on an expected or ground truth speed, velocity, and/or acceleration measurement. Based on the gradient or derivative of the loss function, updated parameters for the ML model are computed. For example, parameters of the ML model are stored in trained machine learning technique 420 of database 400. The ML model is then applied with the updated parameters to a second batch of training speed measurements to again estimate a given set of speed, velocity and/or acceleration measurements and apply the speed, velocity and/or acceleration measurements to a loss function for comparison with their corresponding ground truth speed, velocity, and/or acceleration measurements. Parameters of the ML model are again updated and iterations of this training process continue for a specified number of iterations or epochs or until a given convergence criteria has been met.

After the machine learning model is trained, model usage 350 demonstrates application of the model to new data 370, including one or more speed, velocity, and/or acceleration measurements that may be received. The trained machine learning technique may be applied to the new data 370 to generate generated results 380 including predicted speed, velocity, and/or acceleration measurements along a predicted path or trajectory.

FIG. 5 is a flowchart illustrating example process 500 of the access control system 100, according to example embodiments. The process 500 may be embodied in computer-readable instructions for execution by one or more processors such that the operations of the process 500 may be performed in part or in whole by the functional components of the system 100; accordingly, the process 500 is described below by way of example with reference thereto. However, in other embodiments, at least some of the operations of the process 500 may be deployed on various other hardware configurations. Some or all of the operations of process 500 can be in parallel, out of order, or entirely omitted.

At operation 501, the authorization management system 140 receives a plurality of observed speed points, each of the plurality of observed speed points corresponding to a different slice of a plurality of slices of an observed trajectory. For example, the authorization management system 140 receives a set of speed points computed by the client device 120. The client device 120 computes each speed point as a difference in 3D between respective adjacent 3D coordinates divided by a difference between their respective timestamps.

In some embodiments, the client device 120 or authorization management system 140 determines that a sequence of speed, velocity or acceleration measurements is missing one or more data points. Specifically, the client device 120 or authorization management system 140 can determine the average sampling interval used to generate the observed speed points. For example, the client device 120 or authorization management system 140 can determine that the observed speed points include a sequence of seven observed speed points. A subset of the observed speed points (e.g., 6 out of 7) may have been computed on the basis of a first sampling interval (e.g., the difference between two timestamps used to compute the speed measurements may be a first value) and another subset (e.g., 1 out of the 7) may have been computed on the basis of a second sampling interval that is larger or double the first sampling interval. In this case, the client device 120 or authorization management system 140 can determine that one speed point is missing from the sequence because of the missing timestamp that resulted in the larger sampling interval. In such circumstances, the client device 120 or authorization management system 140 can perform interpolation techniques (linear interpolation, polynomial interpolation, spline interpolation, Gaussian process, etc.) to fill-in the missing data and increase the number of speed measurements by one or more interpolated speed measurements. This results in the sequence of speed measurements including a total of 8 measurements (when seven were observed), to make a prediction on future trajectory. This interpolated sequence of speed measurements can be provided to the authorization management system 140 to predict a speed measurement. Similar techniques can be applied to generate a sequence of velocity or acceleration measurements.

At operation 502, the authorization management system 140 processes the plurality of observed speed points corresponding to the observed trajectory by a machine learning technique to generate a plurality of predicted speed points, the machine learning technique being trained to establish a relationship between a plurality of training observed speed points and training predicted speed points. For example, the trajectory prediction system 144 applies a trained machine learning model to the set of speed points received from the client device 120 to predict future speed points.

At operation 503, the authorization management system 140 determines a future trajectory based on the plurality of predicted speed points, each of the plurality of predicted speed points corresponding to a different slice of a plurality of slices of the future trajectory. For example, the trajectory prediction system 144 multiplies the predicted speed measurements by a computed, estimated, or known sampling rate to derive a future 3D coordinate or set of 3D future slices of a predicted path.

At operation 504, the authorization management system 140 determines that a target access control device is within a threshold range of the future trajectory. For example, the authorization management system 140 obtains a range for a access control device 110 that is within a certain geographical distance of the client device 120 (e.g., or that is within a BLE communication protocol range). The authorization management system 140 determines whether the future trajectory of the client device 120 falls within the obtained range.

At operation 505, the authorization management system 140 in response to determining that the target access control device is within the threshold range of the future trajectory, performs an operation associated with the target access control device 110. For example, the authorization management system 140 instructs the access control device 110 to grant access to the client device 120 (e.g., by unlocking an electronic door lock). In some cases, the authorization management system 140 controls the lock or secure resource directly bypassing the access control device 110.

Figure 6:
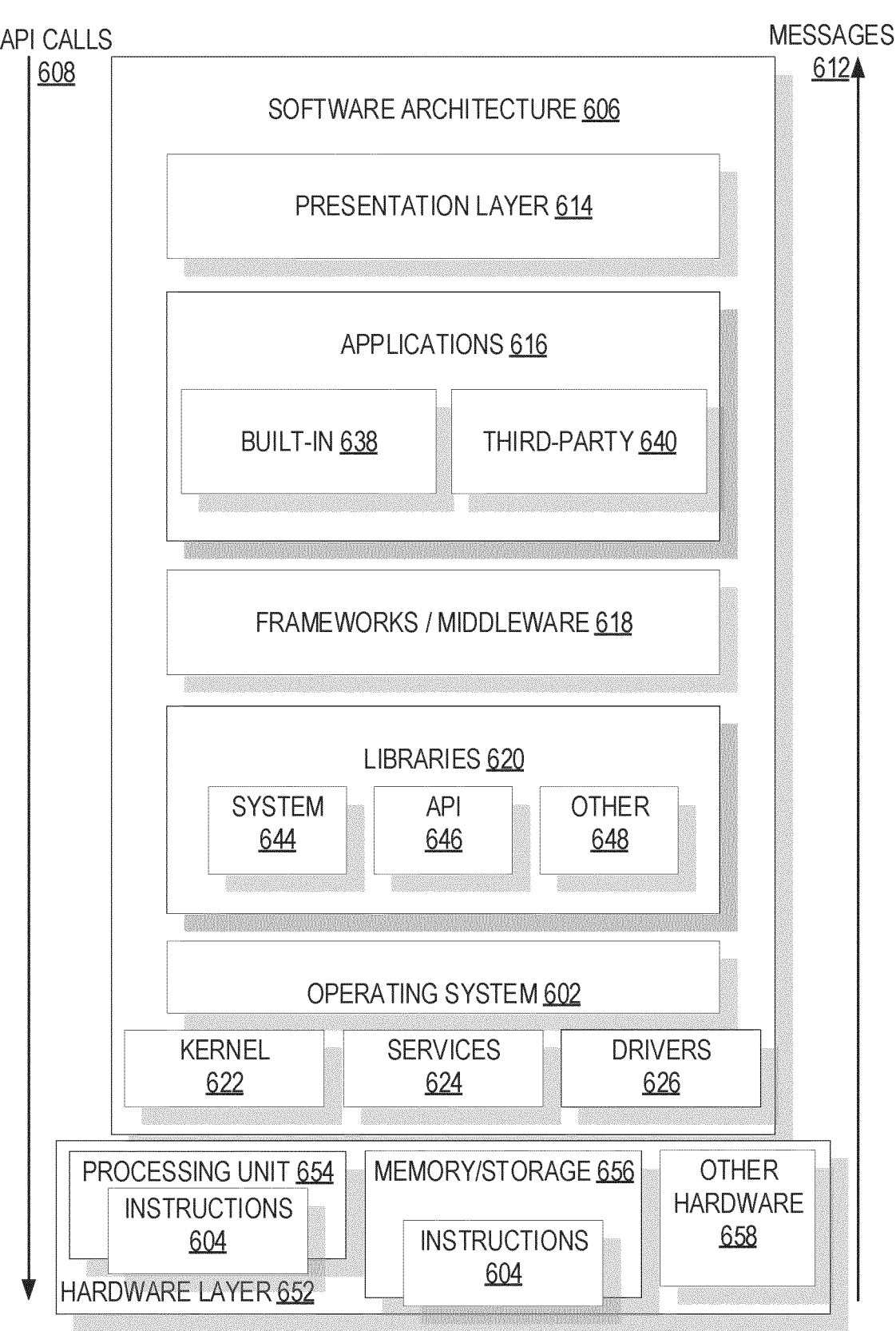
FIG. 6 is a block diagram illustrating an example software architecture, which may be used in conjunction with various hardware architectures herein described.

FIG. 6 is a block diagram illustrating an example software architecture 606, which may be used in conjunction with various hardware architectures herein described. FIG. 6 is a non-limiting example of a software architecture and it will be appreciated that many other architectures may be implemented to facilitate the functionality described herein. The software architecture 606 may execute on hardware such as machine 700 of FIG. 7 that includes, among other things, processors 704, memory 714, and input/output (I/O) components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components, and so forth described herein. The hardware layer 652 also includes memory and/or storage devices memory/storage 656, which also have executable instructions 604. The hardware layer 652 may also comprise other hardware 658. The software architecture 606 may be deployed in any one or more of the components shown in FIG. 1.

In the example architecture of FIG. 6, the software architecture 606 may be conceptualized as a stack of layers where each layer provides particular functionality. For example, the software architecture 606 may include layers such as an operating system 602, libraries 620, frameworks/middleware 618, applications 616, and a presentation layer 614. Operationally, the applications 616 and/or other components within the layers may invoke API calls 608 through the software stack and receive messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, BLE drivers, UWB drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624 and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/devices.

The frameworks/middleware 618 (also sometimes referred to as middleware) provide a higher-level common infrastructure that may be used by the applications 616 and/or other software components/devices. For example, the frameworks/middleware 618 may provide various graphic user interface functions, high-level resource management, high-level location services, and so forth. The frameworks/middleware 618 may provide a broad spectrum of other APIs that may be utilized by the applications 616 and/or other software components/devices, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built-in operating system functions (e.g., kernel 622, services 624, and/or drivers 626), libraries 620, and frameworks/middleware 618 to create UIs to interact with users of the system. Alternatively, or additionally, in some systems, interactions with a user may occur through a presentation layer, such as presentation layer 614. In these systems, the application/component "logic" can be separated from the aspects of the application/component that interact with a user.

Figure 7:
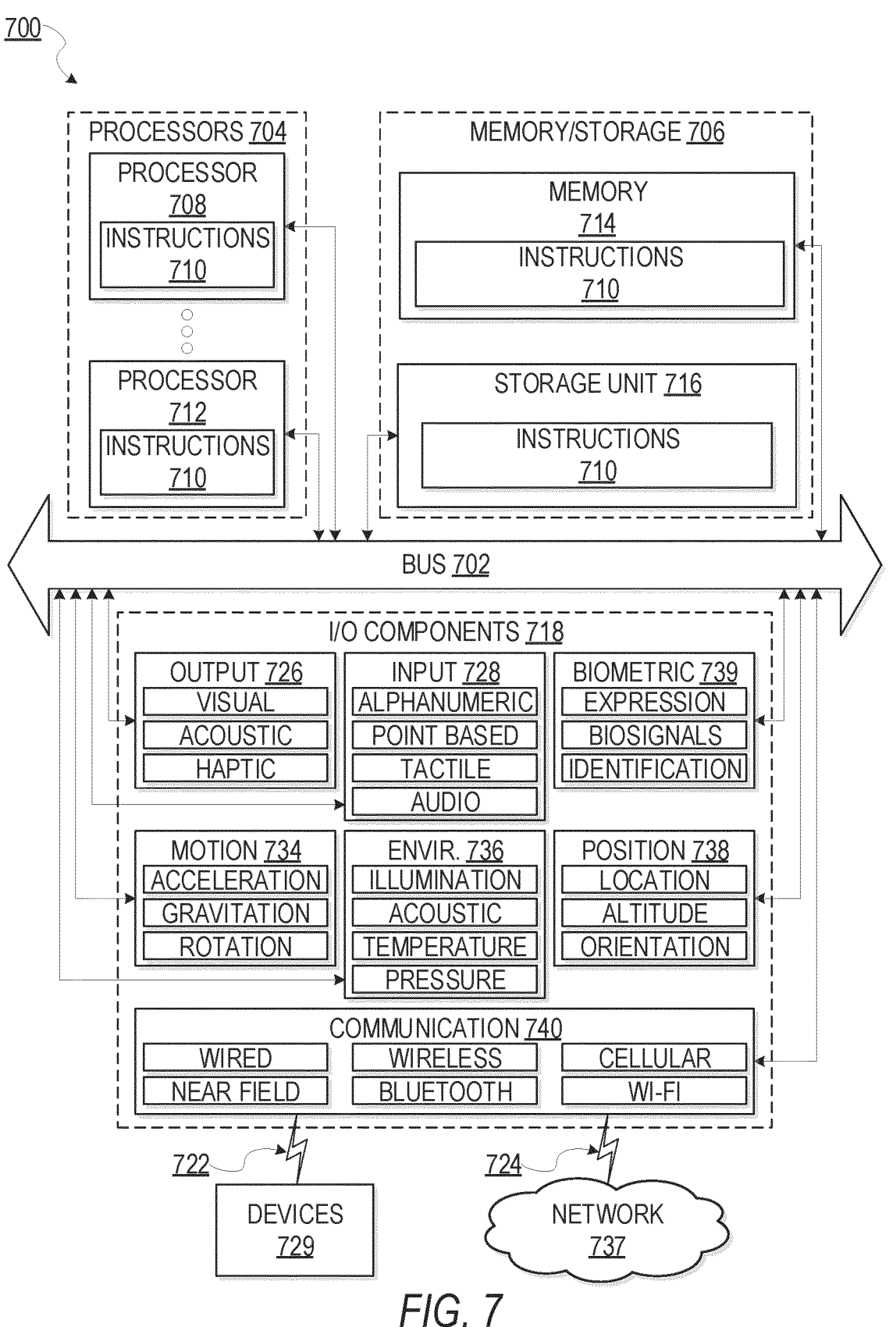
FIG. 7 is a block diagram illustrating components of a machine, according to some example embodiments.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed.

As such, the instructions 710 may be used to implement devices or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a STB, a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory/storage 706, and I/O components 718, which may be configured to communicate with each other such as via a bus 702. In an example embodiment, the processors 704 (e.g., a CPU, a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 708 and a processor 712 that may execute the instructions 710. The term "processor" is intended to include multi-core processors 704 that may comprise two or more independent processors (sometimes referred to as "cores") that may execute instructions contemporaneously. Although FIG. 7 shows multiple processors 704, the machine 700 may include a single processor with a single core, a single processor with multiple cores (e.g., a multi-core processor), multiple processors with a single core, multiple processors with multiple cores, or any combination thereof.

The memory/storage 706 may include a memory 714, such as a main memory, or other memory storage, database 710, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a LED display, a LCD, a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 739, motion components 734, environmental components 736, or position components 738 among a wide array of other components. For example, the biometric components 739 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environmental components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 737 or devices 729 via coupling 724 and coupling 722, respectively. For example, the communication components 740 may include a network interface component or other suitable device to interface with the network 737. In further examples, communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 729 may be another machine or any of a wide variety of peripheral devices (e.g., a peripheral device coupled via a USB).

Moreover, the communication components 740 may detect identifiers or include components operable to detect identifiers. For example, the communication components 740 may include RFID tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultra book, netbook, laptop, multi-processor system, microprocessor-based or programmable consumer electronics, game console, set-top box, or any other communication device that a user may use to access a network.

"COMMUNICATIONS NETWORK" in this context refers to one or more portions of a network that may be an ad hoc network, an intranet, an extranet, a VPN, a LAN, a BLE network, a UWB network, a WLAN, a WAN, a WWAN, a metropolitan area network (MAN), the Internet, a portion of the Internet, a portion of the PSTN, a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device, or other tangible media able to store instructions and data temporarily or permanently and may include, but is not limited to, RAM, ROM, buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a FPGA or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC, or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

What is claimed is:

1. A method comprising:

receiving, from a client device, by one or more processors, a plurality of observed speed points, each of the plurality of observed speed points corresponding to a different slice of a plurality of slices of an observed trajectory;

retrieving a first timestamp of a first of the plurality of observed speed points representing when the first of the plurality of speed points was received from the client device and a second timestamp of a second of the plurality of observed speed points representing when the second of the plurality of speed points was received from the client device, the first and second speed points being determined by the client device using a wireless communication antenna;

determining a sampling rate of the client device based on a difference between the first timestamp and the second timestamp;

processing the plurality of observed speed points corresponding to the observed trajectory by a machine learning technique to generate a plurality of predicted speed points, the machine learning technique being trained to establish a relationship between a plurality of training observed speed points and training predicted speed points;

determining a future trajectory based on the plurality of predicted speed points, each of the plurality of predicted speed points corresponding to a different slice of a plurality of slices of the future trajectory and based on the sampling rate;

determining that a target access control device is within a threshold range of the future trajectory; and in response to determining that the target access control device is within the threshold range of the future trajectory, performing an operation associated with the target access control device.

2. The method of claim 1, wherein the plurality of observed speed points comprise acceleration measurements, wherein the plurality of predicted speed points comprise a plurality of acceleration measurements, and wherein the target access control device comprises a lock associated with a door; and wherein the performing the operation comprises unlocking the door.

3. The method of claim 2, further comprising:

establishing a wireless communication link between a mobile device of a user and the target access control device;

exchanging authorization information over the wireless communication link; and performing the operation after determining that the user is authorized, based on the authorization information, to access the target access control device.

4. The method of claim 3, further comprising:

determining that the user is authorized, based on the authorization information, to access the target access control device prior to performing the operation; and delaying performing the operation after determining that the user is authorized until the target access control device is determined to be within the threshold range of the future trajectory.

5. The method of claim 3, wherein the wireless communication link comprises a first communication protocol; and wherein the plurality of observed speed points are received over a second communication protocol.

6. The method of claim 5, wherein the target access control device is located indoors.

7. The method of claim 3, further comprising:

determining that the user is authorized, based on the authorization information, to access the target access control device prior to performing the operation; and preventing performing the operation after determining that the user is authorized in response to determining that the target access control device is outside of the threshold range of the future trajectory.

8. The method of claim 1, wherein the machine learning technique comprises a neural network.

9. The method of claim 1, wherein receiving the plurality of observed speed points comprises:

receiving a first data point representing a first two-dimensional (2D) or three-dimensional (3D) Cartesian coordinate at a first time point;

receiving a second data point representing a second 2D or 3D Cartesian coordinate at a second time point, each of the first and second data points corresponding to a first slice of the plurality of slices; and computing a first observed speed point of the plurality of observed speed points as a function of a difference between the first and second 2D or 3D Cartesian coordinates and a difference between the first and second time points.

10. The method of claim 1, wherein the machine learning technique generates the plurality of predicted speed points independently of a sampling rate of the plurality of observed speed points.

11. The method of claim 1, wherein determining the future trajectory based on the plurality of predicted speed points comprises:

computing three-dimensional Cartesian coordinates of the future trajectory based on the plurality of predicted speed points, a current location of a user, and the sampling rate at which the plurality of observed speed points is received.

12. The method of claim 1, further comprising training the machine learning technique by:

obtaining a first batch of training data comprising a first set of the plurality of training observed speed points and a corresponding first set of the training predicted speed points;

processing the first set of the training observed speed points with the machine learning technique to generate a plurality of estimated speed points;

computing, based on a loss function, a loss based on a deviation between the plurality of estimated speed points and the corresponding first set of the training predicted speed points; and updating parameters of the machine learning technique based on the computed loss function.

13. The method of claim 12, wherein the first set of the plurality of training observed speed points correspond to a first sampling rate, further comprising:

obtaining a second batch of training data comprising a second set of the plurality of training observed speed points, wherein the second set of the plurality of training observed speed points correspond to a second sampling rate;

processing the second set of the training observed speed points with the machine learning technique to generate a second plurality of estimated speed points;

computing, based on the loss function, a second loss based on a deviation between the second plurality of estimated speed points and the corresponding first set of the training predicted speed points; and updating parameters of the machine learning technique based on the second loss.

14. A system comprising:

one or more processors coupled to a memory comprising non-transitory computer instructions that when executed by the one or more processors perform operations comprising:

receiving, from a client device, a plurality of observed speed points, each of the plurality of observed speed points corresponding to a different slice of a plurality of slices of an observed trajectory;

retrieving a first timestamp of a first of the plurality of observed speed points representing when the first of the plurality of speed points was received from the client device and a second timestamp of a second of the plurality of observed speed points representing when the second of the plurality of speed points was received from the client device, the first and second speed points being determined by the client device using a wireless communication antenna;

determining a sampling rate of the client device based on a difference between the first timestamp and the second timestamp;

processing the plurality of observed speed points corresponding to the observed trajectory by a machine learning technique to generate a plurality of predicted speed points, the machine learning technique being trained to establish a relationship between a plurality of training observed speed points and training predicted speed points;

determining a future trajectory based on the plurality of predicted speed points, each of the plurality of predicted speed points corresponding to a different slice of a plurality of slices of the future trajectory and based on the sampling rate;

determining that a target access control device is within a threshold range of the future trajectory; and in response to determining that the target access control device is within the threshold range of the future trajectory, performing an operation associated with the target access control device.

15. The system of claim 14, wherein the plurality of observed speed points comprise acceleration measurements, wherein the plurality of predicted speed points comprise a plurality of acceleration measurements, wherein the target access control device comprises a lock associated with a door; and wherein the performing the operation comprises unlocking the door.

16. The system of claim 15, wherein the operations further comprise:

establishing a wireless communication link between a mobile device of a user and the target access control device;

exchanging authorization information over the wireless communication link; and performing the operation after determining that the user is authorized, based on the authorization information, to access the target access control device.

17. The system of claim 16, wherein the operations further comprise:

determining that the user is authorized, based on the authorization information, to access the target access control device prior to performing the operation; and delaying performing the operation after determining that the user is authorized until the target access control device is determined to be within the threshold range of the future trajectory.

18. A non-transitory computer readable medium comprising non-transitory computer-readable instructions for performing operations comprising:

receiving, from a client device, a plurality of observed speed points, each of the plurality of observed speed points corresponding to a different slice of a plurality of slices of an observed trajectory;

retrieving a first timestamp of a first of the plurality of observed speed points representing when the first of the plurality of speed points was received from the client device and a second timestamp of a second of the plurality of observed speed points representing when the second of the plurality of speed points was received from the client device, the first and second speed points being determined by the client device using a wireless communication antenna;

determining a sampling rate of the client device based on a difference between the first timestamp and the second timestamp;

processing the plurality of observed speed points corresponding to the observed trajectory by a machine learning technique to generate a plurality of predicted speed points, the machine learning technique being trained to establish a relationship between a plurality of training observed speed points and training predicted speed points;

determining a future trajectory based on the plurality of predicted speed points, each of the plurality of predicted speed points corresponding to a different slice of a plurality of slices of the future trajectory and based on the sampling rate;

determining that a target access control device is within a threshold range of the future trajectory; and in response to determining that the target access control device is within the threshold range of the future trajectory, performing an operation associated with the target access control device.

19. The non-transitory computer readable medium of claim 18, wherein the plurality of observed speed points comprise acceleration measurements, wherein the plurality of predicted speed points comprise a plurality of acceleration measurements, wherein the target access control device comprises a lock associated with a door; and wherein the performing the operation comprises unlocking the door.

20. The non-transitory computer readable medium of claim 19, wherein the operations further comprise:

establishing a wireless communication link between a mobile device of a user and the target access control device;

exchanging authorization information over the wireless communication link; and performing the operation after determining that the user is authorized, based on the authorization information, to access the target access control device.

* * * * *